July 31, 1962

V. K. GRAVES 3,047,340

MATERIAL HANDLING APPARATUS

Filed Sept. 29, 1958

INVENTOR.
VERL K. GRAVES
BY
M. A. Hobbs
ATTORNEY

July 31, 1962 V. K. GRAVES 3,047,340
MATERIAL HANDLING APPARATUS
Filed Sept. 29, 1958 4 Sheets-Sheet 4

INVENTOR.
VERL K. GRAVES
BY *M. A. Hobbs*
ATTORNEY

United States Patent Office 3,047,340
Patented July 31, 1962

3,047,340
MATERIAL HANDLING APPARATUS
Verl K. Graves, South Bend, Ind., assignor to
George O. Graves, South Bend, Ind.
Filed Sept. 29, 1958, Ser. No. 763,987
7 Claims. (Cl. 302—17)

The present invention relates to a material handling apparatus, and more particularly to an apparatus for transferring solid materials from one location to another.

One of the principal objects of the present invention is to provide an apparatus for transporting and elevating light, breakable materials from one location to another, using air currents and gravity for moving the materials.

Another object of the invention is to provide a pneumatic conveyor mechanism for handling light frangible objects, lifting said objects from one elevation to another without breaking or otherwise damaging the objects.

The type of materials for which the present conveyor mechanism was primarily developed is illustrated in my U.S. Patent No. 2,842,072 and consists of cereal meal, such as corn meal, treated by a process in which the meal is first mixed with water in an amount less than that required to form a paste and the resultant mixture ground and extruded at a temperature sufficiently high to vaporize the moisture in the corn meal mix. The material as it emerges from the extrusion die is severed into sections of the desired length forming an elongated object highly cellular and brittle in texture and light in weight. The corn meal objects are usually approximately the diameter of a lead pencil and up to two or three inches in length. The material thus produced is normally stored and possibly shipped before it is further pocessed by baking and coating with cheese. Moving of the material from the extruding machine to a storage bin heretofore has resulted in considerable breakage and flaking, thus rendering a substantial amount unsuitable for further processing and sale. It is therefore an important object of the invention to provide an apparatus for transferring collets as they leave the extruding machine to a storage bin or shipping carton without causing any appreciable breakage to the individual collets.

Still another object is to provide a conveyor apparatus for transporting light frangible materials, which is versatile and relatively simple in construction and operation and which can easily be installed and adapted to various plant facilities.

A further object of the invention is to provide a pneumatic conveyor mechanism which is safe, sanitary and trouble-free and which can be readily adjusted to varying characteristics in the materials being handled.

Additional objects and advantages will become apparent from the following description and accompanying drawings, wherein.

Figure 1:
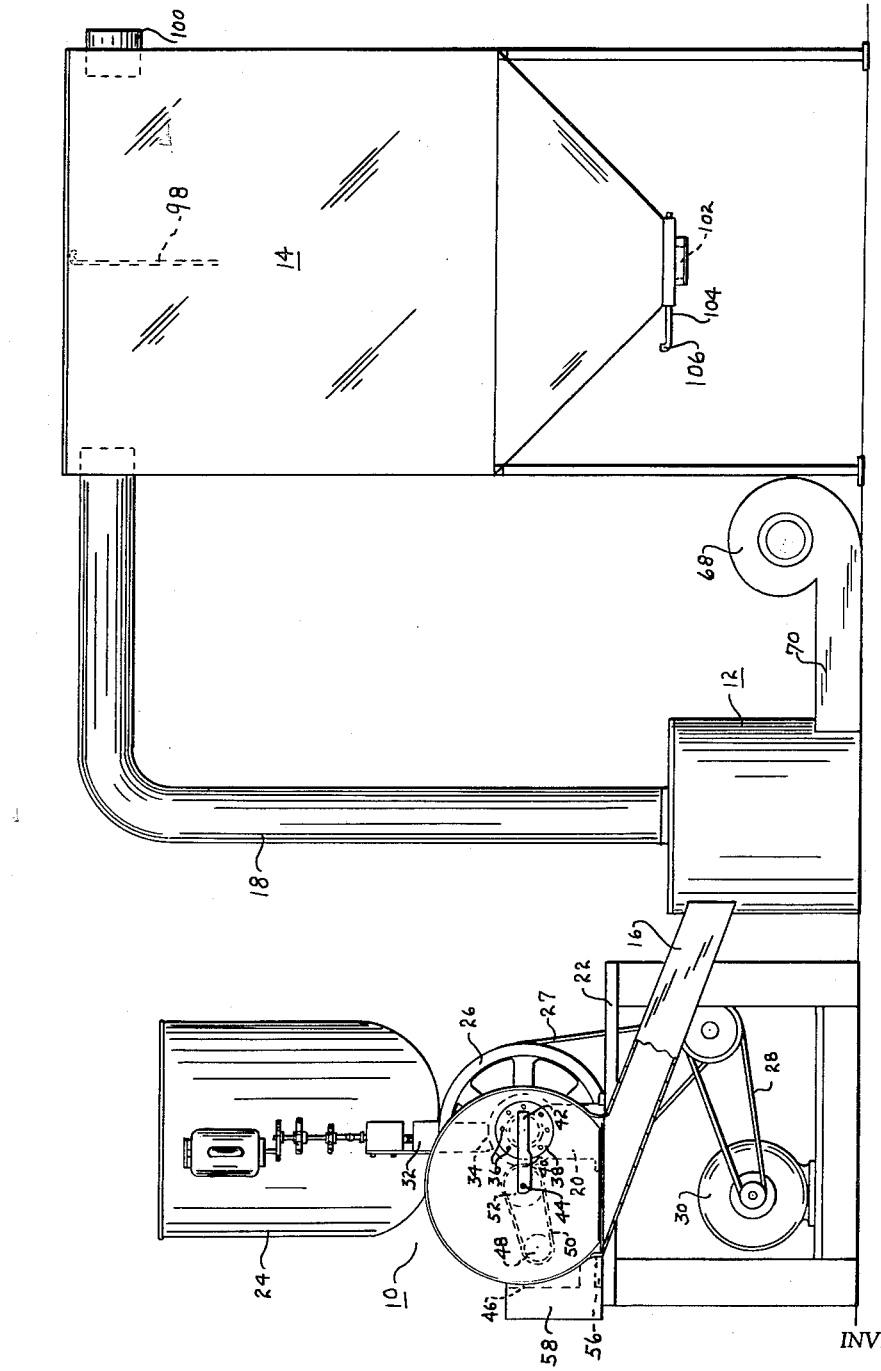
FIGURE 1 is an elevational view of my conveyor apparatus shown installed in a system for producing and storing processed cereal products of the type described above.
Figure 2:
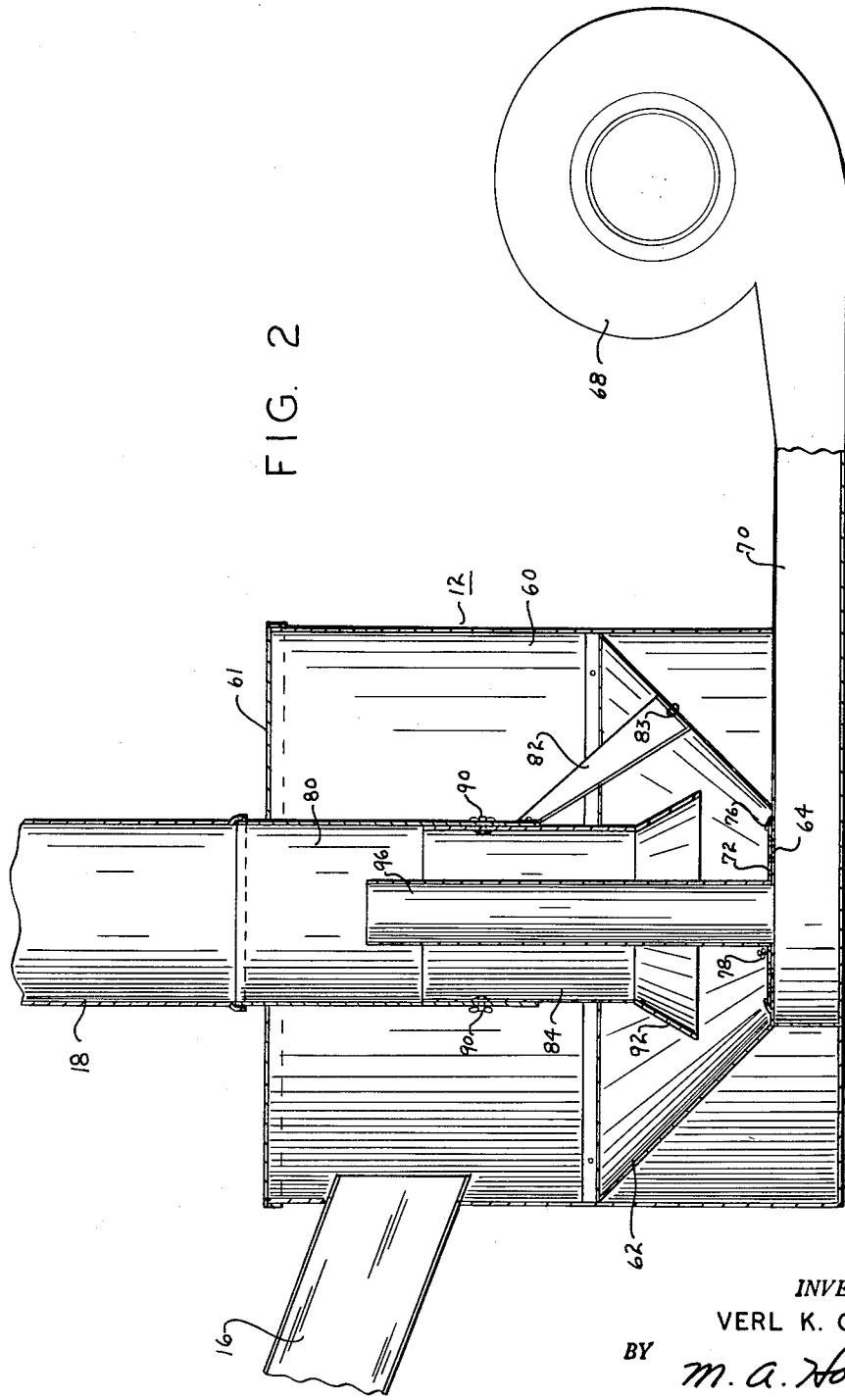
FIGURE 2 is a vertical cross sectional view of my conveyor mechanism showing the operative relationship of the various parts.
Figure 3:
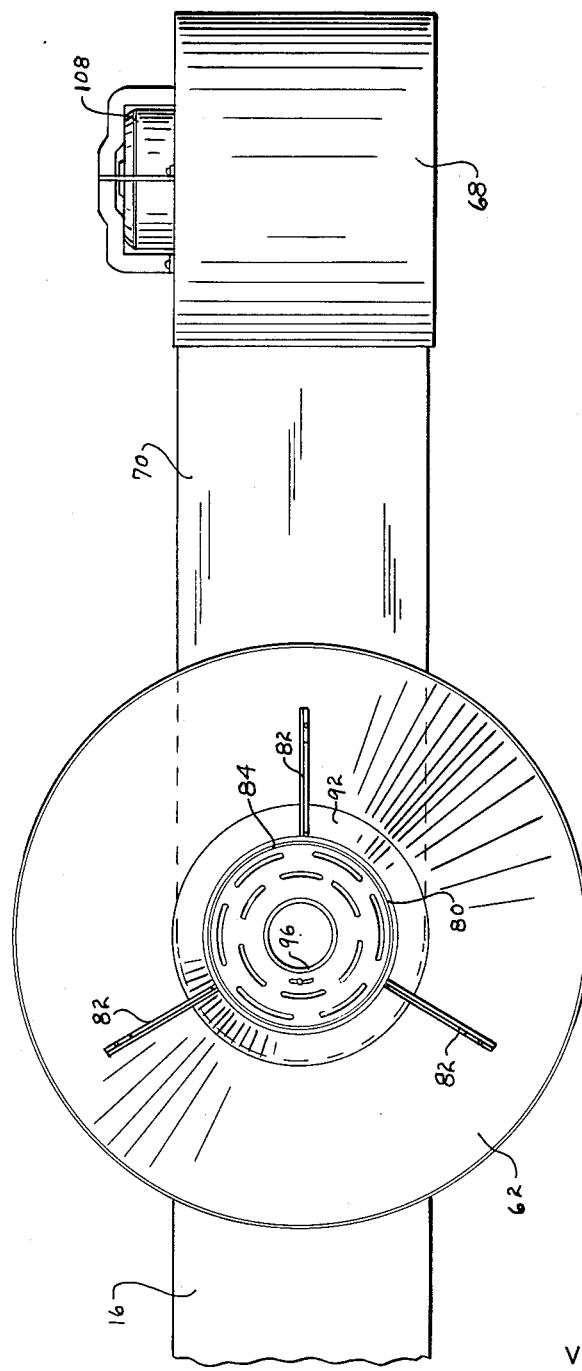
FIGURE 3 is a top plan view of the conveyor mechanism shown in the preceding figures, with the cover removed.
Figures 4, 5:
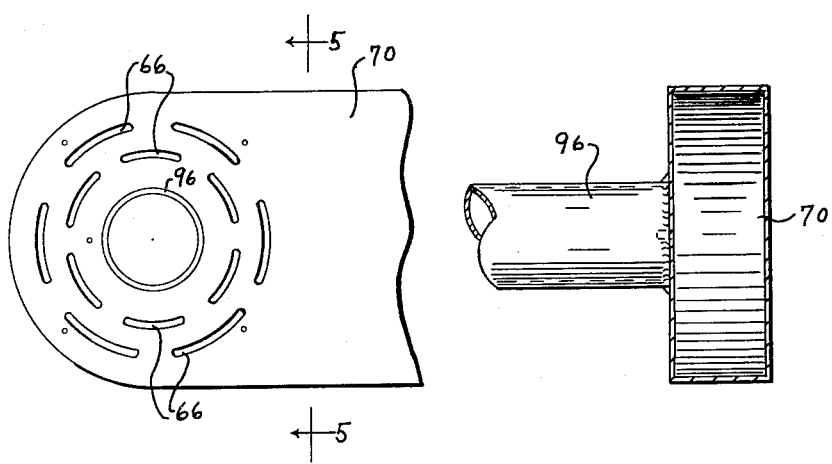
FIGURE 4 is an enlarged top plan view of a portion of the primary and secondary air discharge jet construction.
FIGURE 5 is a cross sectional view of the air supply duct, taken on line 5—5 of FIGURE 4.
Figures 6, 7:
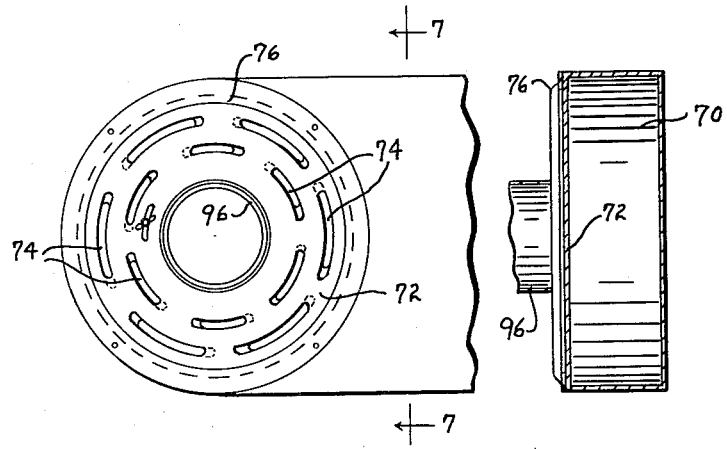
FIGURE 6 is a top plan view of the air discharge jet construction shown with a plate for adjusting the amount of air discharged through the primary air jets.
FIGURE 7 is a cross sectional view taken on line 7—7 of FIGURE 6.

Referring more specifically to the drawings and to FIGURE 1 in particular, numeral 10 designates a machine for processing corn meal, 12 my conveyor mechanism, 14 a bin for storing the processed corn meal product, 16 a chute for transferring the product from the machine to the conveyor mechanism, and 18 a pipe for transferring the product from mechanism 12 to the bin. The corn meal processing machine and the bin shown in the drawings are included to illustrate a complete system wherein relatively light frangible materials or objects are transferred from one location or station to another without breaking, chipping or otherwise damaging the product. The type of food processing machine illustrated in FIGURE 1 is shown in detail and claimed in my U.S. Patent No. 2,842,072 and produces the highly cellular, frangible finger-shaped product described earlier herein. The present invention, however, is not limited to products of this type, but may be used advantageously for moving in bulk any similar light weight material from one station or location to another; the size and shape of the particles or objects comprising the material may vary over a wide range.

Since the cereal processing machine is described in detail in the aforementioned patent, it will only be described briefly herein. A housing 20 which contains the meal extruding mechanism is mounted on a base 22 and supports a hopper 24 for the corn meal ready to be processed by the machine. The meal extruding mechanism is driven through a pulley 26 and a plurality of V-belts 27 and 28 by a motor 30 mounted in the lower portion of base 22, and is supplied with corn meal from hopper 24 through a chamber 32 in which the meal is mixed with a small amount of moisture, thoroughly stirred and thence discharged into the throat 34 of the extruding mechanism. This mixture is propelled by a screw (not shown) and extruded through the holes 36 in a head plate 38 at a temperature sufficiently high to vaporize the moisture in the mixture and to prebake the material sufficiently to render it relatively brittle. As the material emerges from the holes in the head plate in cylindrical form it is cut into sections of the desired length by a revolving power driven knife 40. The sections fall into chute 16 and slide into conveyor mechanism 12 preferably placed near the machine. While the extruded cereal product is described as cylindrical in shape, it may be any other desired shape such as rectangular, square or oval in cross section, or relatively flat.

The machine is operated continuously over long periods of time during the day without attention or servicing and the product manufactured on the machine must be continually removed. Knife 40 for cutting the extruded material into sections as it emerges from holes 36 consists of a blade 42 mounted on the end of a shaft 44 which is driven by a motor (not shown) through a gear reduction box 46, sprocket 48, chain 50 and sprocket 52 mounted on the end of shaft 44 opposite the knife blade, said gear reduction box being mounted on a supporting member 56 secured to the base. The motor for driving the blade is mounted behind box 58 and is provided with a conventional variable speed pulley so that the speed at which the blade revolves can be synchronized with the rate at which the material is being extruded from the head plate and can be varied relative to said rate to vary the length of the sections into which the extruded material is cut.

Figure 8:
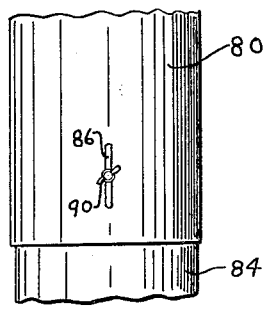
FIGURE 8 is an enlarged fragmentary elevational view of one of the adjustment means for the conveyor mechanism.

Conveyor mechanism 12 consists of a cylindrical housing 60 having a cover 61, a frusto-conical wall 62 sloping inwardly and downwardly to a flat disc-shaped bottom 64 provided with a series of annularly arranged primary air holes or slots 66 which are connected to a blower 68 by a conduit 70 extending into the housing and under bottom 64. The effective size of slots 66 can be adjusted to suit requirements by a rotatable disc-shaped plate 72 which lies on the upper surface of bottom 64 and contains holes or slots 74 corresponding to those in the bottom. Plate 72 is held in place on the bottom by an annular flange 76 secured to the bottom and is held in any desired adjusted position by thumb screw 78. Mounted directly above the disc-shaped bottom and concentrically therewith is pipe 80 for receiving the processed material delivered to the conveyor mechanism from machine 10, said pipe being supported in fixed position above bottom 64 by three brackets 82 joined rigidly to the sides of the pipe near its lower end and secured by rivets 83 to the upper surface of wall 62. A pipe extension 84 is mounted in the lower end of pipe 80 and is adapted to be adjusted upwardly and downwardly and held firmly therein by a plurality of slots 86 in pipe 80 and respective cooperating bolts 90, as clearly seen in FIGURE 8. The lower end of extension 84 is provided with an outwardly flaring skirt 92, the lower edge of which has a somewhat larger diameter than the diameter of bottom 64. By adjusting pipe extension 84 upwardly and downwardly the space between the lower edge of skirt 92 and wall 62 can be varied to adapt the mechanism for handling particles or objects of different sizes and weights.

A vertically arranged tube 96 projects upwardly from the center of bottom 64 through extension 84 and into the lower end of pipe 80 a substantial distance, and communicates with blower 68 through conduit 70. The processed material delivered from the machine 10 through chute 16 falls onto wall 62 and slides under skirt 92 onto plate 72 over slots 66, and is lifted by the jets of air from those slots into pipe 80 beyond the upper end of tube 96. The flow of air from tube 96 carries the material upwardly through pipe 18 to bin 14 and discharges it from the pipe onto a flexible member such as cloth or a plastic sheet 98 which deflects the material downwardly permitting it to fall gently to the bottom of the bin. The air entering the bin through pipe 18 escapes from the bin through outlet conduit or port 100. The material stored in bin 14 is withdrawn through an opening 102 in the bottom thereof, said opening being controlled by a sliding valve or door 104 operated by a handle 106. Except for pipe 18, port 100 and the opening in the bottom, bin 14 is preferably fully enclosed.

The particular type of blower is not important, the one shown being a conventional wheel type with a built-in electric motor 108. The air is drawn through the openings at the two sides of the blower and is discharged through conduit 70 and thence through slots 66 and 74 and simultaneously through tube 96. The blower may be placed remote from conveyor mechanism 12 and connected by a suitable conduit, and an air filter may be placed in the system either at the intake of the blower or between blower 68 and mechanism 12.

In the operation of the present system, including the conveyor apparatus described, meal is placed in hopper 24 and the food processing machine and blower motor placed in operation. The meal is extruded through holes 36 in plate 38 and is cut into sections by revolving knife 40. As the sections are severed by the knife, they fall into chute 16 and are delivered to housing 60 where they fall onto conical wall 62 and slide onto plate 72 above overlapping slots 66 and 74. The air from these slots lifts the sections upwardly carrying them into extension 84 and into pipe 80 above the upper end of tube 96 where the air from tube 96 propels them upwardly through pipe 18 into the upper portion of bin 14. On entering the bin, the air pressure and velocity are substantially decreased, permitting the sections to fall and settle into the lower portion of the bin and the air entering through pipe 18 escapes through port 100. The material delivered to the bin is withdrawn through opening 102 into a carton or other container for further processing or shipping.

The arrangement of conveyor mechanism 12 with relation to machine 10 and bin 14 may be changed to fit any particular plant layout and facilities, and various changes and modifications in addition to those mentioned hereinabove may be made without departing from the scope of the present invention. While the conveyor mechanism has been illustrated in combination with a food processing machine, said machine can be used satisfactorily in combination with other types of machines and equipment and for moving various types of materials.

I claim:

1. A conveyor system for handling in bulk relatively light frangible objects, comprising a cylindrical housing with its axis in vertical position, a frusto-conically shaped wall member positioned with its small end downwardly in said housing, a bottom in the lower end of said member having a plurality of concentrically arranged arcuate slots therethrough, a rotatable plate on the upper surface of said bottom having slots corresponding to the slots in said bottom, a blower, a conduit connecting said blower with said slots, a vertically arranged outlet pipe of substantially the same diameter as said bottom positioned above and spaced from said bottom, an extension in the lower end of said pipe movable toward and away from said bottom, an outwardly and downwardly flaring annular flange on the bottom of said extension, the lower end of said flange having a cross sectional area sufficiently large to embrace the area in said bottom containing said holes, a vertically arranged tube in the center of said bottom extending upwardly into the lower end of said pipe and communicating with said conduit, and a materials inlet opening in said housing above said wall member.

2. A conveyor system for handling in bulk relatively light frangible materials, comprising a housing, an inwardly and downwardly extending wall member in said housing, a bottom in the lower end of said member, a plurality of holes therethrough, a rotatable plate on the upper surface of said bottom having holes corresponding to the holes in said bottom, a blower, a conduit connecting said blower with said holes, a vertically arranged outlet pipe positioned above and spaced from said bottom, an outwardly and downwardly flaring annular flange on the bottom of said pipe, the lower end of said flange having a cross sectional area sufficiently large to embrace the area in said bottom containing said holes, a vertically arranged tube in the center of said bottom extending upwardly into the lower end of said pipe above said flange and communicating with said conduit, and an inlet opening in said housing above said wall member.

3. A conveyor system for handling in bulk relatively light frangible materials, comprising a frusto-conically shaped wall member positioned with its small end downwardly, a bottom in the lower end of said member having a plurality of concentrically arranged arcuate slots threrethrough, a rotatable plate on the upper surface of said bottom having slots corresponding to the slots in said bottom, a conduit connecting a source of air under pressure with said slots, an outlet pipe positioned above and spaced from said bottom, an outwardly and downwardly flaring annular flange on the bottom of said pipe, the lower end of said flange having a cross sectional area sufficiently large to embrace the area in said bottom containing said holes, and a vertically arranged tube extending upwardly into the lower end of said pipe above said flange and communicating with said conduit.

4. A conveyor apparatus for handling in bulk relatively light frangible materials, comprising a cylindrical housing with its axis in vertical position, a frusto-conically shaped wall member positioned with its small end downwardly in said housing, a bottom in the lower end of said member, a plurality of holes therethrough, a blower, a conduit connecting said blower with said holes, a vertically arranged outlet pipe positioned above and spaced from said bottom, an extension in the lower end of said pipe movable toward and away from said bottom, an outwardly and downwardly flaring annular flange on the bottom of said extension, the lower end of said flange having a cross sectional area sufficiently large to embrace the area in said bottom containing said holes, a vertically arranged tube extending upwardly into the lower end of said pipe above said flange and communicating with said conduit, and an inlet opening in said housing above said wall member.

5. A conveyor mechanism for moving relatively light frangible materials, comprising an inwardly and downwardly extending wall member, a bottom in the lower end of said member, a plurality of holes therethrough, a blower, a conduit connecting said blower with said holes, an outlet pipe having a downwardly and outwardly extending flange positioned above and spaced from said bottom, the lower end of said pipe having a cross sectional area sufficiently large to embrace the area in said bottom containing said holes, and a vertically arranged tube extending upwardly into the lower end of said pipe to a point above the smallest diameter of said flange and communicating with said conduit.

6. A conveyor mechanism for moving relatively light frangible materials, comprising an inwardly and downwardly extending wall member positioned with its small end downwardly, a bottom in the lower end of said member, a plurality of holes therethrough, a conduit connecting a source of air under pressure with said holes, an outlet pipe positioned above and spaced away from said bottom, an extension in the lower end of said pipe movable toward and away from said bottom an outwardly and downwardly flaring annular flange on the bottom of said extension, the lower end of said flange having a cross sectional area sufficiently large to embrace the area in said bottom containing said holes, and a vertically arranged tube extending upwardly into said extension above said flange and communicating with said conduit.

7. A conveyor mechanism for moving materials, comprising walls sloping inwardly and downwardly, a bottom at the lower end of said walls, a plurality of holes therethrough, an outlet pipe positioned above and spaced from said bottom, an outwardly and downwardly flaring annular flange on the bottom of said pipe, the lower end of said flange having a cross sectional area sufficiently large to embrace the area in said bottom containing said holes, a tube extending into said pipe above said flange, and means for supplying air under pressure to said holes and tube.

References Cited in the file of this patent

UNITED STATES PATENTS

| | | |
|---|---|---|
| 2,264,108 | Anderson et al. | Nov. 25, 1941 |
| 2,412,152 | Huff | Dec. 3, 1946 |
| 2,656,306 | Bergstrom | Oct. 20, 1953 |
| 2,661,295 | Francis et al. | Dec. 1, 1953 |
| 2,662,796 | Shabaker | Dec. 15, 1953 |
| 2,668,636 | Martin | Feb. 9, 1954 |